(12) United States Patent
Sjöberg

(10) Patent No.: US 9,515,506 B2
(45) Date of Patent: Dec. 6, 2016

(54) CAPACITOR SHORT-CIRCUITING IN A HIGH VOLTAGE CONVERTER

(71) Applicant: ABB TECHNOLOGY LTD, Zürich (CH)

(72) Inventor: Christer Sjöberg, Ludvika (SE)

(73) Assignee: ABB TECHNOLOGY LTD, Zürich (CH)

( * ) Notice: Subject to any disclaimer, the term of this patent is extended or adjusted under 35 U.S.C. 154(b) by 0 days.

(21) Appl. No.: 14/780,938

(22) PCT Filed: Jun. 17, 2013

(86) PCT No.: PCT/EP2013/062493
§ 371 (c)(1),
(2) Date: Sep. 28, 2015

(87) PCT Pub. No.: WO2014/202109
PCT Pub. Date: Dec. 24, 2014

(65) Prior Publication Data
US 2016/0056654 A1    Feb. 25, 2016

(51) Int. Cl.
  *H02J 7/00* (2006.01)
  *H02M 7/00* (2006.01)
  *H02M 1/32* (2007.01)
  *H02J 7/34* (2006.01)

(52) U.S. Cl.
  CPC ............ *H02J 7/0063* (2013.01); *H02J 7/0029* (2013.01); *H02M 7/003* (2013.01); *H02J 7/345* (2013.01); *H02J 2007/0067* (2013.01); *H02M 2001/322* (2013.01)

(58) Field of Classification Search
  CPC ...... H02J 7/0029; H02J 7/0063; H02J 7/345; H02J 2007/0067; H02M 2001/322; H02M 7/003

USPC .......................................... 320/136, 162, 166
See application file for complete search history.

(56) References Cited

U.S. PATENT DOCUMENTS

| | | | |
|---|---|---|---|
| 8,362,754 B2 | 1/2013 | Maebara et al. | |
| 8,779,730 B2 * | 7/2014 | Jiang-Hafner | H02M 7/483 320/140 |
| 2010/0059245 A1 | 3/2010 | Dorn et al. | |
| 2011/0222324 A1 | 9/2011 | Mabuchi et al. | |
| 2012/0049837 A1 | 3/2012 | Chimento et al. | |
| 2013/0027983 A1 | 1/2013 | Nate et al. | |

FOREIGN PATENT DOCUMENTS

| | | |
|---|---|---|
| WO | WO 2008/074275 A1 | 6/2008 |
| WO | WO 2012/013245 A1 | 2/2012 |

* cited by examiner

*Primary Examiner* — Edward Tso
*Assistant Examiner* — Aaron Piggush
(74) *Attorney, Agent, or Firm* — Birch, Stewart, Kolasch & Birch, LLP

(57) ABSTRACT

A short-circuiting arrangement for capacitors of a high voltage converter are provided, the capacitors each having two connection terminals, the arrangement including a short-circuiting wire configured to be moved along while in sliding contact with the connection terminals and including a short-circuiting section with electrically conductive material connected to a ground potential and a probing section with electrically conductive material and a voltage evaluating unit electrically connected to the short-circuit section and the probing section and configured to detect, as the probing section and short-circuiting section are connected to the respective connection terminals, the voltage across the capacitor, compare the voltage with a discharge threshold and halt or move the short-circuiting wire based on the detected voltage.

20 Claims, 7 Drawing Sheets

CAPACITOR SHORT-CIRCUITING IN A HIGH VOLTAGE CONVERTER

FIELD OF INVENTION

The present invention generally relates to short-circuiting of capacitors in high voltage converters. More particularly the present invention relates to a short-circuiting arrangement for capacitors of a high voltage converter and a method for discharging of capacitors in such high voltage converters.

BACKGROUND

High voltage converters, such as voltage source converters or current source converters, are equipped with capacitors that are charged to high voltage levels.

A voltage source converter may for instance be a so-called two-level converter where a capacitor bank is provided between two DC outputs of the converter. The converter may also be a cascaded multilevel converter, made up of a number of cells, in which case each cell may comprise a capacitor.

When not in operation, it is important that these capacitors are discharged.

Furthermore, when not in operation, maintenance may have to be made in an environment where the converter is located, where such an environment may be a so-called valve hall. Before service personnel are allowed into this environment, there may exist a requirement that the capacitors are completely discharged. In order to ensure that this has happened, the capacitors may need to be short-circuited. This means that there may exist a requirement to short-circuit the capacitors of a converter before service personnel are allowed to enter the valve hall.

The invention is directed towards providing such short-circuiting in a safe, reliable and efficient way.

SUMMARY OF THE INVENTION

One object of the present invention is to provide safe, reliable and efficient short-circuiting of capacitors in a high voltage converter.

This object is according to a first aspect of the invention achieved through a short-circuiting arrangement for capacitors of a high voltage converter, the capacitors each having two connection terminals and the arrangement comprising a short-circuiting wire configured to be moved along while in sliding contact with the connection terminals of the capacitors and comprising a short-circuiting section comprising electrically conductive material connected to a ground potential, and a probing section comprising electrically conductive material, and a voltage evaluating unit electrically connected to the short-circuit section and the probing section and further configured to detect, as the probing section and short-circuiting section are connected to a respective connection terminal of a capacitor, the voltage across the capacitor, compare the voltage with a discharge threshold and enable halting or movement of the short-circuiting wire based on the detected voltage.

This object is according to a second aspect of the present invention also achieved through a method for short-circuiting capacitors of a high voltage converter, the capacitors each having two connection terminals and the method comprising:

moving a short-circuiting wire along while in sliding contact with the connection terminals of a capacitor of the converter, the short-circuiting wire having a short-circuiting section comprising electrically conductive material connected to a ground potential and a probing section comprising electrically conductive material, measuring the voltage across the capacitor as the probing section and short-circuiting section are connected to respective connection terminals of the capacitor, comparing the voltage with a discharge threshold, and enabling halting or movement of the short-circuiting wire based on the detected voltage.

Embodiments of the present invention have a number of advantages. Embodiments of this disclosure provide safe, reliable and efficient short-circuiting of capacitors in a high voltage converter. This also allows service personnel to safely enter an area where the high voltage capacitors are located.

BRIEF DESCRIPTION OF THE DRAWINGS

Embodiments of the present invention will in the following be described with reference being made to the accompanying drawings, where FIG. 1 schematically shows a single line diagram of a converter connected between an AC system and a DC system, FIG. 2 schematically shows a phase leg of a cascaded multilevel or cell based voltage source converter, FIG. 3 schematically shows a short-circuiting wire with a short-circuiting section being pulled passed capacitors of the converter in order to short-circuit these capacitors.

DETAILED DESCRIPTION OF THE INVENTION

In the following, a detailed description of embodiments of a short-circuiting arrangement and a method for short-circuiting capacitors of a high voltage converter will be given.

A high voltage converter may be a converter connected between a Direct Current (DC) system and an Alternating Current (AC) system, which systems may both be power transmission systems. The DC system can for instance be a High Voltage Direct Current (HVDC) power transmission system and the AC system may be a Flexible Alternating Current Transmission System (FACTS). However these types of systems are mere examples of such systems. The converter can also be applied in for instance DC back-to-back systems and power distribution systems.

Figure 1:
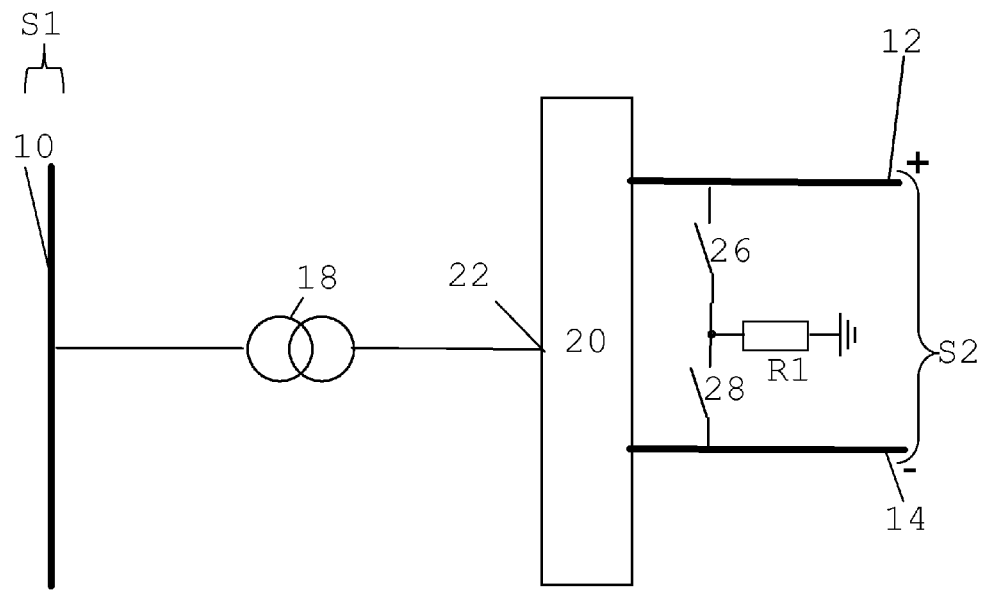

FIG. 1 schematically shows a single line diagram of a converter 20 connected between an AC system S1 and a DC system S2. The AC system S1 is in this example a three-phase AC system and normally includes three conductors. In the figure only one conductor 10 is shown. The DC system S2 in turn includes two poles that are coupled to the AC system via the converter 20. As there are two poles in this example, the DC system may be a bipole system. It should be realized that the invention can also be used with a monopole system, which may be an unsymmetrical or a symmetrical monopole system. It should here furthermore be realized that both the DC and AC system could include a lot more elements than the poles and conductors shown. However, these are not central for the understanding of the present invention and have therefore been omitted.

The converter 20 may function as a rectifier and/or inverter. The converter 20 is in examples of the invention given later a cell based voltage source converter or a cascaded multilevel converter. However, it should be realized that the invention is not limited to this type of voltage source converter. The converter may for instance also be a two-level converter or a neutral-point clamped three level converter. In fact the type of converter used is not limited to being a voltage source converter, but may also be a current source converter.

The high voltage converter 20 has a DC side for connection to the DC system S2 and more particularly to at least one pole of the DC system and an AC side for being coupled to the AC system. On the AC side, the converter 20 has a number of AC terminals, one for each phase. On the DC side the converter 20 has a number of DC terminals 12 and 14, one for each pole, where a first DC terminal 12 is connected to a first pole and a second DC terminal 14 is connected to a second pole. Since the figure is a single line diagram only one AC terminal 22 is shown together with the two DC terminals 12 and 14.

The converter 20 is coupled to the AC network via a transformer 18 having a primary side with a primary winding for being coupled to the AC system S1 and a secondary side with a secondary winding coupled to the AC side of the converter 20. It should here be realized that the transformer 18 may in some cases be omitted.

There is in FIG. 1 a selectable DC connection to ground provided for each pole, i.e. a connection leading from a corresponding DC terminal to ground. In FIG. 1 there is a first DC ground switch 26 in series with a common discharge resistor R1 and a second DC ground switch 28 also in series with the common discharge resistor R1. The discharge resistor R1 is thus common to both poles. The ground switches are open in normal operation of the converter 20.

Figure 2:
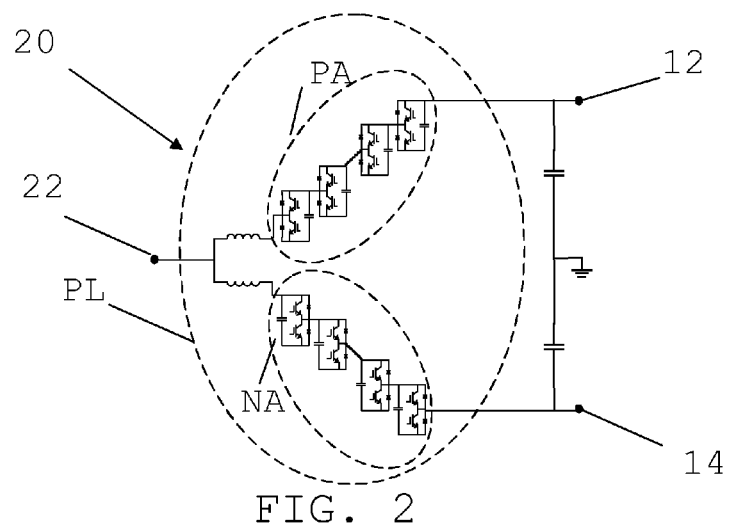

FIG. 2 shows a block schematic outlining an example of a cell based voltage source converter 20, which is often also termed a cascaded multilevel converter.

The converter is in the form of a symmetric monopole converter and includes a number of phase legs, where there is one phase leg for each phase. A converter thus includes at least two and in this case three phase legs. However, in FIG. 2, only one such phase leg is shown.

As can be seen in FIG. 2, a phase leg PL of this converter 20 includes a number of cells connected in cascade, where each cell includes a capacitor in parallel with at least one branch of switching elements, here each branch comprises two switching elements. Each switching element is provided in the form of a transistor with anti-parallel diode. At the midpoint of the phase leg PL the AC terminal 22 is provided. In the converter in FIG. 2 there is furthermore a first and second phase reactor, provided on opposite sides of the AC terminal 22. The phase leg is furthermore divided into two phase arms. There is one phase arm, here denoted a positive phase arm PA, between the AC terminal 22 and the first DC terminal 12 and another phase arm, here denoted negative phase arm NA, between the AC terminal 22 and the second DC terminal 14. A phase arm may thus include half of the cells of the phase leg and one phase reactor. In parallel with the phase leg PL there is in this example a capacitor bank (here shown including two capacitors). The midpoint of this capacitor bank is here grounded.

It should here be realized that in some variations of the converter 20, the capacitor bank may be removed. The placing of the phase reactors can also be varied.

The cells displayed in FIG. 2 are half-bridge cells. It should however be realized that a cell based converter can be based on a number of type of cells, such as full-bridge cell and different types of double voltage contribution cells. However, this will not be described in any further detail.

The converter 20 may need to be shut down in various situations. It may need to be shut down for service and/or maintenance. As a part of this shutting down, the switching elements of the cells are blocked, which involves turning off the transistors of the switching elements. However, the capacitors need also to be discharged. When the cells are blocked, the cell capacitors are in effect connected in series with each other.

The discharging may be performed using the DC ground switches 26 and 28 and the common discharging resistor R1.

Through the use of the common discharging resistor R1, it is possible to quickly discharge the cell capacitors. However, before any service personnel are allowed to enter the environment where the converter is placed, which may be in a building such as valve hall, there has to be ensured that the capacitors have all been fully discharged. This may be done through short-circuiting all the capacitors. Through short-circuiting the capacitors it is thus ensured that there is no remaining charge and it is thereby safe for the personnel to enter the building.

Figure 3:
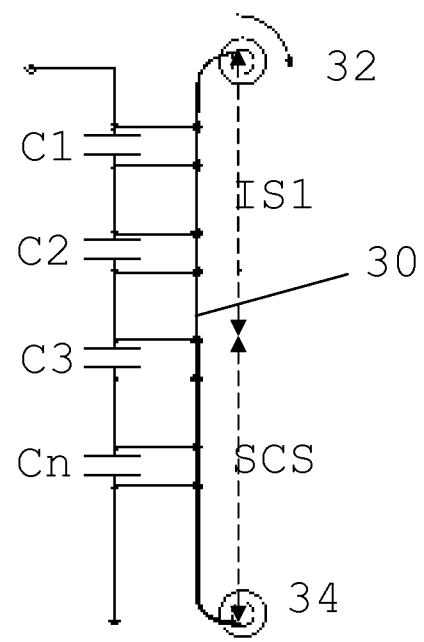

One way to safely short-circuit the capacitors is through the use of a wire connected to a ground potential. This is exemplified in FIG. 3, where there are a number n of cascaded cell capacitors C1, C2, C3 and Cn, each provided with two connection terminals. In the drawing there is also shown a wire 30 being provided on two pulleys 32 and 34 and being moved, for instance by being pulled, through the connection terminals of the capacitors C1, C2, C3 and Cn. The wire 30, which is a short-circuiting wire, has an insulating section IS1 and a short-circuiting section SCS, where the short-circuiting section SCS is formed by electrically conducting material being connected to a ground potential and the insulating section IS1 is formed by electrically insulating material. The insulating section IS1 may here be provided in a first part of the wire 30 that first passes the capacitors C1, C2, C3 and Cn when the wire is pulled, while the short-circuiting section SCS may be provided in a second part of the wire that passes the capacitors C1, C2, C3 and Cn after the insulation section IS1. It can be seen that through pulling or moving the short-circuiting wire 30 along the connection terminals or connection points of the capacitors C1, C2, C3 and Cn, the capacitors will be sequentially discharged. After this has been done for all the capacitors in the converter, the valve hall will then be safe to enter.

Figure 4:
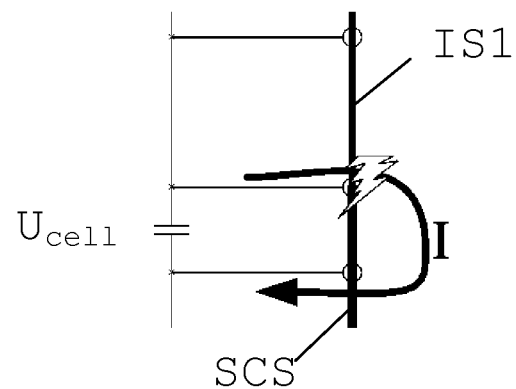
FIG. 4 illustrates the consequences if a capacitor having a too-high voltage is short-circuited.

However, there is a problem in that during the initially mentioned discharging, one or more of the capacitors may not have discharged sufficiently and may thereby have a high residual charge. If such a capacitor is being short-circuited or grounded, then the whole energy of the capacitor will be discharged through the conducting wire. This may lead to the wire and the connection terminals of the capacitor getting welded together. This is schematically indicated in FIG. 4. If this happens, then the wire 30 will get stuck and the following capacitors that have not yet been short-circuited will be very hard to short-circuit. Thereby the service personnel will be stopped from entering the valve hall.

Embodiments of the present invention are directed towards improving on this situation.

In embodiments of a short-circuiting arrangement a specialized short-circuiting wire 30a is used. A part of this short-circuiting wire 30a according to a first embodiment is shown together with a simplified cell 48 in FIG. 5. The cell 48 is simplified since the only element shown is the capacitor C which has a voltage Ucell. The cell is also provided with a first connection terminal 44 and a second connection terminal 46, where the first connection terminal 44 is connected to a first end of the capacitor C, and the second connection terminal 46 is connected to a second end of the capacitor C. The potential at the first end may be higher than the potential at the second end and therefore the first end may also be termed a positive end and the second end may be termed a negative end. The connection terminals 44 and 46 may here be formed as rings, in which rings the short-circuiting wire 30a may be placed in sliding contact.

The short-circuiting wire 30a comprises a first insulating section IS1, a short-circuiting section SCS and a probing section PS, where the first insulating section IS1 stretches longitudinally from an upper end of the short-circuiting wire 30a, the short-circuiting section stretches longitudinally from a lower end of the short-circuiting wire 30a and the probing section PS is provided in-between. Both the short-circuiting section SCS and the probing section PS may be provided using electrically conducting material, such as copper. The first insulating section IS1 may be made of a solid insulating material. The probing section PS may here also be a section of solid electrically conducting material. The probing section 42 may more particularly abut the end of the insulating section IS1 furthest away form the upper end of the short-circuiting wire 30a and connect to an inner conductor 43 that stretches centrally and longitudinally in the interior of the short-circuiting wire 30a to the lower end of the short-circuiting wire 30a. Between the probing section PS and the short-circuiting section SCS there is second section IS2 of insulating material, which insulating material thus radially surrounds the inner conductor 43. Thereafter follows the short-circuiting section SCS. The short circuiting section SCS stretches or extends in the longitudinal direction along the short-circuiting wire 30a from the second insulating section IS2 to the lower end of the short-circuiting wire 30a. Because of this the short-circuiting section SCS comprises the inner conductor 43 and an outer conductor 45, which outer conductor 45 is connected to a ground potential. The short circuit section thus comprises electrically conductive material connected to the ground potential. The outer conductor 45 is located or provided on the periphery or the surface of the short-circuiting wire 30a in parallel with and electrically separated from the inner conductor 45. The separation may be provided through a layer of insulating material. The outer conductor is thus insulated in the radial direction from the inner conductor.

Figure 6:
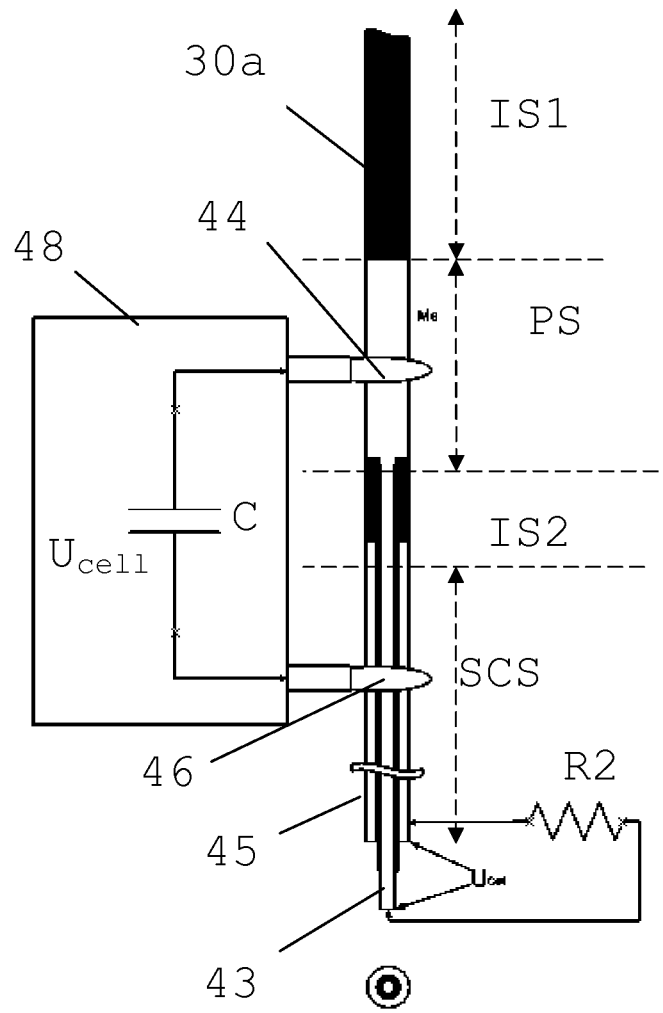
FIG. 6 shows the short-circuiting wire and a resistor used in a short-circuiting arrangement according to a second embodiment, FIG. 7 schematically shows the short-circuiting arrangement according to the second embodiment together with a number of capacitors.

In operation the short-circuiting wire 30a is moved, for instance by being pulled, so that initially the first insulating section IS1 is in contact with both the first and second connection terminals 44 and 46. Thereafter the probing section PS will get in contact with the second connection terminal 46, while the first connection terminal 44 is still connected to the insulating section IS1. After the short-circuiting wire 30a is moved a bit further, the probing section PS will get electrically connected to the first connection terminal 44 and the outer conductor 45 of the short-circuiting section SCS will get electrically connected to the second connection terminal 46. In this situation it is possible to detect a voltage between the probing section and the short-circuiting section. This situation is depicted in FIG. 6. At this moment the pulling of the short-circuiting wire 30a may be stopped and the voltage UCell of the capacitor C may be measured.

It can thus be seen that as the short-circuiting wire 30a is pulled or moved so that the probing section 42 is connected to the first connection terminal 44 and the outer conductor 45 of the short circuit section 46 to the second connection terminal 46, the voltage Ucell of the capacitor C may be measured using the short-circuiting wire 30a, where the central conductor 43 of the short-circuiting wire 30a has the cell potential and the outer conductor 45 has the ground potential.

This may be used for detecting the voltage of the capacitor C and knowledge about the capacitor voltage may be used for stopping the movement of the short-circuiting wire 30a. The movement may for instance be stopped until the capacitor voltage Ucell has fallen below a discharge threshold, which discharge threshold is a threshold for the capacitor voltage that signifies that a discharge is needed. It is possible that the cell 48 comprises a discharging resistor and this means that it is possible to stop movement until the cell has been sufficiently discharged via the cell resistor so that the capacitor voltage has fallen below the discharge threshold. This means that it is possible to passively wait until the capacitor voltage has fallen below the discharge threshold through the discharging performed within the cell. The discharge threshold may here be set in relation to a possible destruction of the short-circuiting wire 30a, i.e. may be set to correspond to a level that the short-circuiting wire 30a may withstand without melting. In this way halting or movement of the short-circuiting wire 30a is enabled based on the detected voltage.

If the voltage is below the discharge threshold, movement may then be continued, which will lead to both the first and second connection terminals 44 and 46 being connected to the outer conductor 45 of the short-circuiting section SCS. Thereby the capacitor C will be short-circuited, resulting in emptying the capacitor C of any residual charge. As this discharging is performed from a voltage level that is below the discharge threshold, no harm will be made to the short-circuiting wire 30a.

Figure 5:
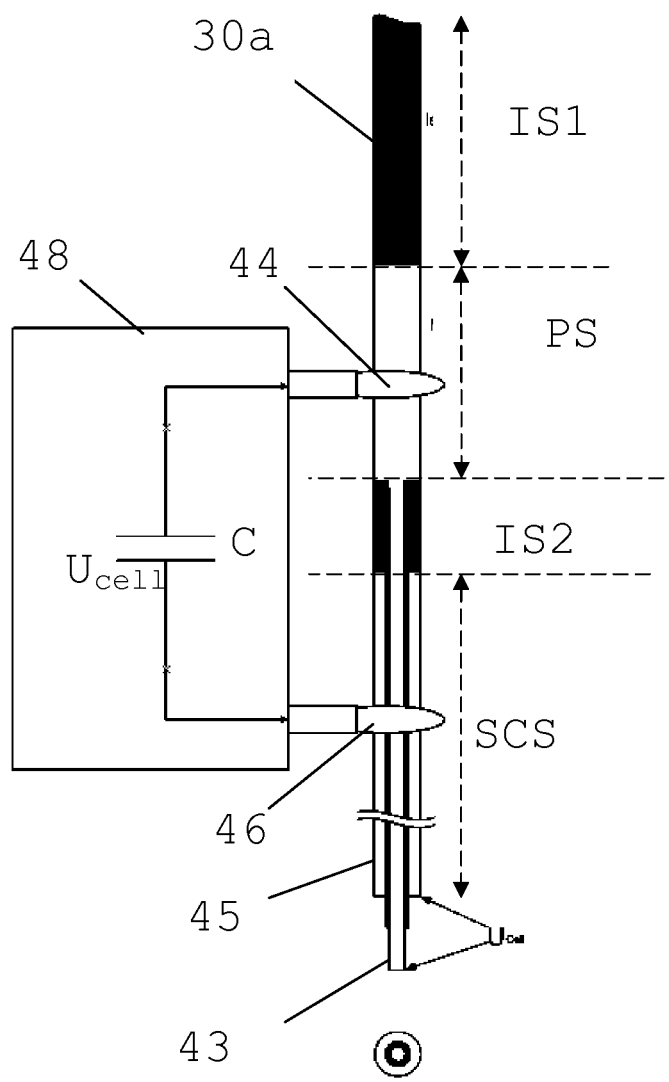
FIG. 5 shows the short-circuiting wire used in a first embodiment.

A second embodiment will now be described with reference being made to FIGS. 6, 7 and 8, where FIG. 6 shows the same short-circuiting wire 30a and cell structure as in FIG. 5. The only difference is that there is a second discharge resistor R2 connected between the inner conductor 43 and the outer conductor 45 of the short-circuiting wire 30a. There is thus a resistor R2 connected between the probing section PS and ground. This is beneficial if the cell lacks a discharge resistor or if the cell discharge resistor is faulty. If there is a discharge resistor in the cell, then the second discharge resistor speeds up the discharging.

Figure 7:
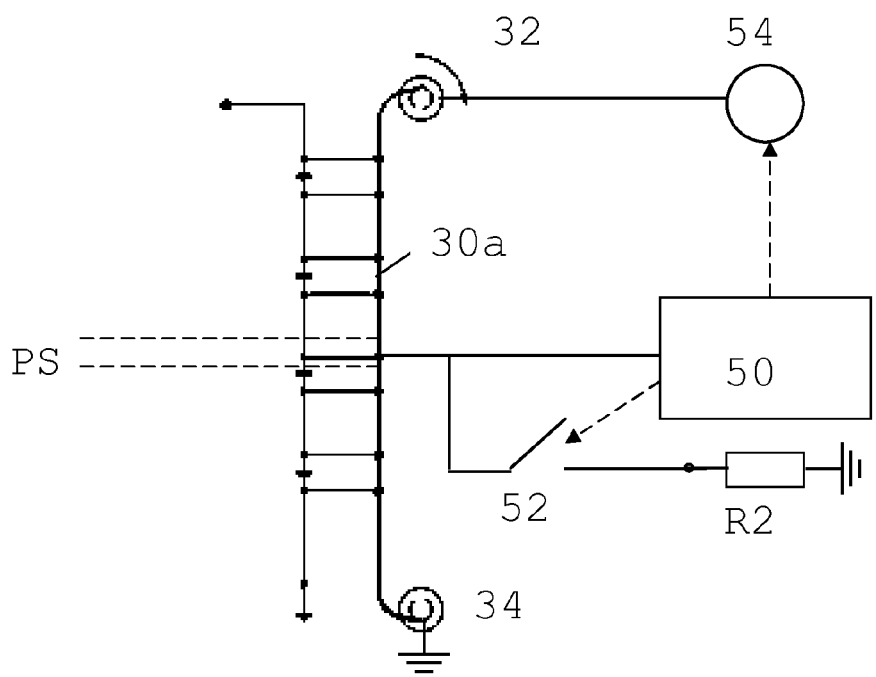

FIG. 7 schematically shows an arrangement comprising the short-circuiting wire 30a being moved or pulled from the second pulley 34 to the first pulley 32 along a number of capacitors through the aid of a motor 54 connected to the first pulley 32. In the figure there is also a voltage evaluating unit 50 that receives measurements measured at the probing section PS of the short-circuiting wire 30a. The voltage evaluating unit 50 is electrically connected to the short-circuit section SCS and the probing section 42. In the drawing it is shown as being directly connected to the probing section PS and to ground. However, in reality it may be connected to the probing section via the inner conductor 43. It may also be connected to the short-circuiting section SCS via the outer conductor 45. The voltage evaluating unit 50 selectively controls a switch 52 which connects the probing section PS with the discharging resistor R2.

Figure 8:
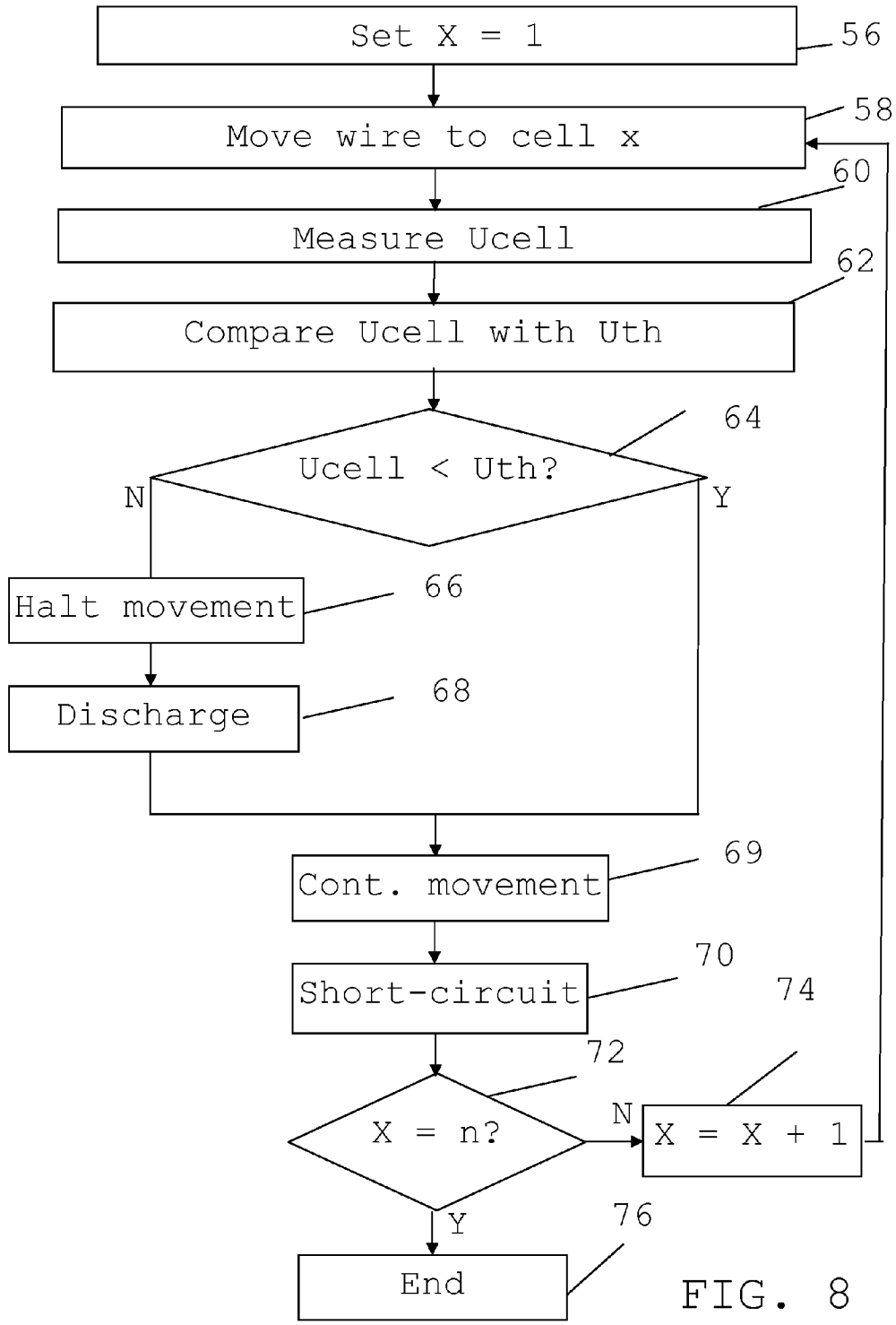
FIG. 8 shows a flow chart of a number of method steps in a method of short-circuiting capacitors in a converter being performed in the short-circuiting arrangement according to the second embodiment.

FIG. 8 shows a number of method steps being performed by the voltage evaluating unit 50.

As can be seen in FIG. 7, there are a number of cells to be passed by the short-circuiting wire 30a, which number may be n. Therefore a cell counter X is first set to be one by the voltage evaluating unit 50, step 56. The voltage evaluating unit 50 then controls the motor 54 so that the short-circuiting wire 30a moves and in this embodiment it is pulled for measuring the capacitor voltage of a first of the cells, step 58.

This means that the probing section PS is electrically connected to the first connection terminal 44 of the capacitor C in the first cell and the outer conductor 45 of the short-circuiting section SCS is electrically connected to the second connection terminal 46.

Then the voltage evaluating unit 50 measures or detects the capacitor voltage Ucell via the first and second connection terminals 44 and 46, step 60, and compares the capacitor voltage Ucell with a discharge threshold Uth, step 62.

If the cell voltage Ucell is above the discharge threshold Uth, step 62, the voltage evaluating unit 50 halts the movement, step 64, through stopping the motor 54 and then ensures that the cell is discharged, step 68. This may be done through the voltage evaluating unit 50 controlling the switch 52 to interconnect the probing section 42 with the resistor R2. This causes the discharging resistor R2 to be connected to ground in parallel with the capacitor C. and thus the capacitor C is discharged. The discharge thus takes place also the movement of the short-circuiting wire 30a has been halted. When the voltage has fallen below the discharge threshold, for instance significantly below the discharge threshold, movement of the short-circuiting wire 30a is continued, step 69, for instance through the voltage evaluating unit 50 controlling the motor 50 to continue moving and thereby the short-circuiting wire 30a is continued to be pulled. After a while both the first and the second connection terminals 44 and 46 of the capacitor C will be electrically connected to the outer conductor 45 of the short-circuiting section SCS so that the capacitor C is short-circuited, step 70. This may be done through the voltage evaluating unit 50 controlling the motor 54 to pull the short-circuiting wire 30a so that both the first and the second connection terminals 44 and 46 are electrically or galvanically connected to the outer conductor 45 of the short-circuiting section SCS of the short-circuiting wire 30a.

If the voltage was below the discharge threshold Uth, step 64, movement is continued, step 69, through the voltage evaluating unit 50 controlling the motor 50 to continue moving and thereby the short-circuiting wire 30a is continued to be pulled. Movement is thus continued without discharging. This movement will lead to the first and the second connection terminals 44 and 46 of the capacitor C being electrically connected to the outer conductor 45 of the short-circuiting section SCS so that the capacitor C is short-circuited, step 70.

It can thus be seen that the voltage evaluating unit 50 enables a halting of the movement as long as the discharge threshold is exceeded and enables a movement of the short-circuiting wire 30a so that the short circuiting-section is connected to both connection terminals of the capacitor when the voltage is below the discharge threshold.

After this has been done the voltage evaluating unit 50 then compares the cell counter x with a maximum cell value, which in this case is n, and if x has reached the value n, step 72, the short-circuiting is completed and the operation is ended, step 76, while if has not, step 72, then the counter is incremented, step 74, and then the voltage evaluating unit 50 controls the motor 54 to move the probing section PS of the short-circuiting wire 30a to the first connection terminal 44 of the capacitor in the next cell, step 58.

It can in this way be seen that destruction of the short-circuiting wire is avoided, which improves short-circuiting operation and avoids delay caused by destroyed short-circuiting wires. A more reliable short-circuiting operation is thus obtained. Thereby service personnel may safely enter the valve hall.

As was described above the capacitor may be provided in a cell. Such a cell may comprise a cell control unit, i.e. control logic that is used for controlling the cell operation, such as controlling the turning on and off of transistors. The cell control unit may for instance comprise one or more gate control units for providing gate signals to the transistors.

It is not uncommon that the power used as supply for the cell control unit is provided via the cell capacitor. This is an efficient way of providing power to the cell control unit.

Furthermore, it is during the maintenance possible that measurements are needed to be made of the cell control unit, and that such measurements require the cell control unit to be powered. However as the cells have been discharged or are about to be discharged there is no power available. A third embodiment of the invention addresses this situation.

Figure 9:
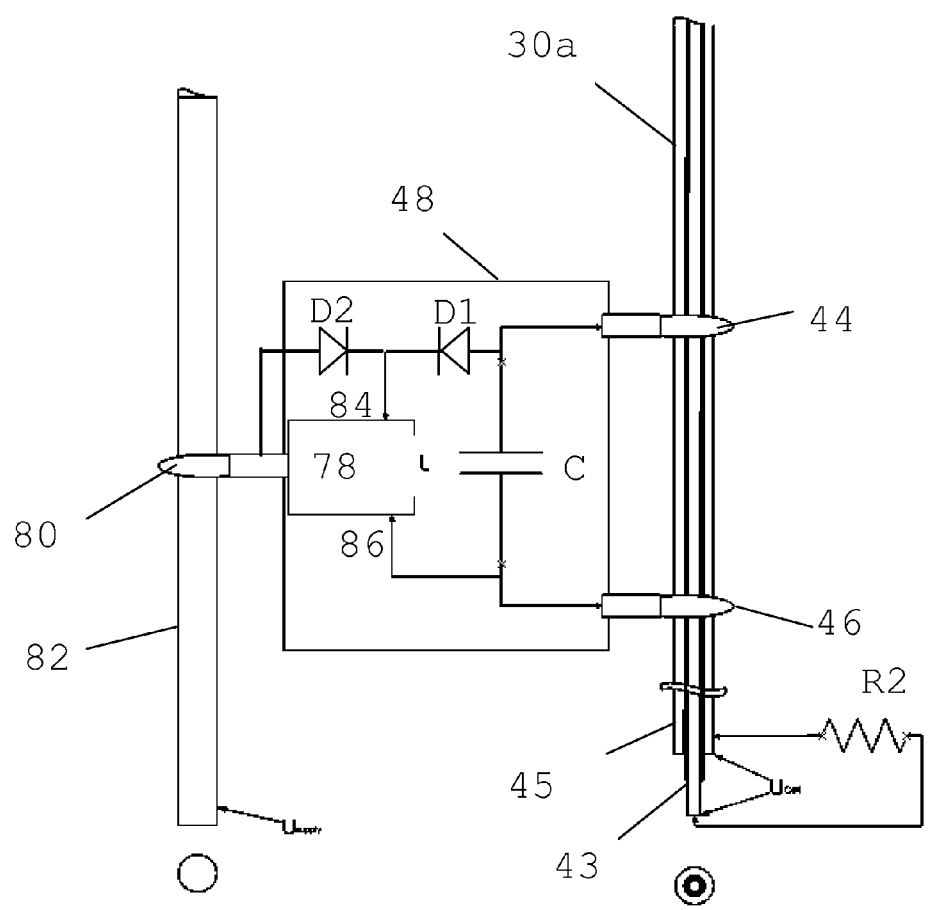
FIG. 9 shows two wires and a resistor used in an short-circuiting arrangement according to a third embodiment.

FIG. 9 schematically shows this situation. FIG. 9 resembles FIG. 7 in that there is a short-circuiting wire 30a connected to the first and second connection terminals 44 and 46 of the capacitor C of a cell 48. In the figure both these connection terminals 44 and 46 are connected to the outer conductor 45 of the short-circuiting section, and therefore the capacitor C is empty. However, in the cell 48 there is also a cell control unit 78 connected to the capacitor C for receiving power. The cell control unit 78 does for this reason have a positive power supply input 84 that is connected to the first end of the capacitor C via a first diode D1, where this first diode D1 has a direction of current conduction from the first end of the capacitor C towards the positive power supply input 84. The cell control unit 78 also has a negative power supply input 86 being connected to the second of the capacitor C. The cell 78 is also provided with a power supply terminal 80, which is connected to the positive power supply input 84 via a second diode D2 having a current conduction direction from the power supply terminal 80 to the positive power supply input 84.

The power supply terminal 80 may be ring shaped and through this terminal there runs a power supply wire 82, which is in sliding contact with the power supply terminal. This power supply wire 82 may be moved, for instance under the control of the voltage evaluating unit and in synchronism with the short circuiting wire 30a, along a number of cells being short-circuited, so that as a cell is being discharged the cell control unit 78 at the same time receives sufficient power to be able to function for making various tests. The two diodes D1 and D2 may here be used in order to ensure that the energy of the cell capacitor C is not transferred to the power supply wire 82 or that the voltage of the power supply wire 82 does not charge the cell capacitor C.

In addition to providing safe, reliable and efficient short-circuiting of the cell capacitors, this embodiment also provides power to the cell control unit and thereby enables cell control unit measurements to be made in a simple manner.

There are a number of variations that are possible to be made of the present invention apart from those already mentioned.

It should first of all be mentioned that the capacitors being discharged are not limited to being cell capacitors, but also other capacitors, for instance the capacitors in a two-level converter may be short-circuited using the same technique. It should also be mentioned that the short-circuiting does not have to be combined with any previous discharging. It is possible that the only discharging of capacitors being made is the discharging in relation to the movement of the short-circuiting wire. The motor may also be omitted. It is for instance possible that the here described wires are pulled by hand. In case a discharging resistor is used, then it may be connected to the short-circuiting wire without a switch. The switch may thus be omitted. The discharging resistor may in some variations thereby always be connected between the probing section and the short-circuiting section. A voltage evaluating unit may be provided in both the first and the second embodiments. It is furthermore possible that the voltage evaluating unit has a very simple functionality. It is for instance possible that the fact that the measured voltage is above or below the discharge threshold is presented to a user, which user then decides if the short-circuiting wire is to be pulled or not. A wire may furthermore be provided for all cells of a phase arm, all cells of a phase leg or for a group of cells in a phase arm or a phase leg. Such a group of cells may be placed aligned with each other, for instance in a row or a stack so that a wire may be moved along them essentially without bending. There may in this case thus be several wires for several groups, which wires may be controlled using one voltage evaluating unit.

A group may as an example include 25, 33% or 50% of the cells of an arm. There may thus be two, three or four groups in a phase arm and the cells of a group may be sequentially short-circuited using a short-circuiting wire.

The voltage evaluating unit may be realized in the form of a processor with accompanying program memory comprising computer program code that performs the desired functionality when being run on the processor.

From the foregoing discussion it is evident that the present invention can be varied in a multitude of ways.

It shall consequently be realized that the present invention is only to be limited by the following claims.

The invention claimed is:

1. A short-circuiting arrangement for capacitors of a high voltage converter, said capacitors each having two connection terminals, the arrangement comprising:
   a short-circuiting wire configured to be moved along while in sliding contact with the connection terminals of the capacitors and comprising:
      a short-circuiting section comprising electrically conductive material connected to a ground potential; and
      a probing section comprising electrically conductive material; and
   a voltage evaluating unit electrically connected to the short-circuit section and the probing section and further configured to:
      detect, as the probing section and short-circuiting section are connected to a respective connection terminal of a capacitor, the voltage across the capacitor;
      compare the voltage with a discharge threshold; and
      enable halting or movement of the short-circuiting wire based on the detected voltage.

2. The short-circuiting arrangement according to claim 1, wherein the voltage evaluating unit when being configured to enable halting or movement of the short-circuiting wire based on the detected voltage is configured to enable a halting of the movement of the short-circuiting wire as long as the discharge threshold is exceeded and enable a movement of the short-circuiting wire so that the short circuiting-section is connected to both connection terminals of the capacitor when the voltage is below the discharge threshold.

3. The short-circuiting arrangement according to claim 2, wherein the voltage evaluating unit is configured to halt movement of the short-circuiting wire when the discharge threshold is exceeded.

4. The short-circuiting arrangement according to claim 3, wherein the voltage evaluating unit, when being configured to halt movement of the short-circuiting wire, is further configured to passively wait until the capacitor voltage has fallen below the discharge threshold.

5. The short-circuiting arrangement according to claim 2, further comprising a resistor connected between the probing section and short-circuiting section of the short-circuiting wire in order to discharge the voltage below the discharge threshold.

6. The short-circuiting arrangement according to claim 5, wherein the voltage evaluating unit is further configured to connect, after the movement of the short-circuiting wire has been halted, the resistor between the probing section and the short-circuiting section in order to control the discharging of the capacitor.

7. The short-circuiting arrangement according to claim 1, further comprising a motor configured to move the short-circuiting wire along a group of capacitors, said motor being connected to the voltage evaluating unit for being controlled.

8. The short-circuiting arrangement according to claim 1, wherein the capacitor is a capacitor in a converter cell, said converter cell further comprising a cell control unit with a power supply terminal, the arrangement further comprising a power supply wire providing a power supply voltage, said power supply wire being configured to be moved along while in sliding contact with the power supply terminal in synchronism with the short-circuiting wire being pulled along the capacitance measurement terminals of the cell.

9. The short-circuiting arrangement according to claim 1, further comprising an insulating section separating the probing section from the short-circuiting section.

10. The short-circuiting arrangement according to claim 1, wherein the voltage evaluating unit is connected to the probing section via an inner conductor extending longitudinally through the short-circuiting wire, wherein said electrically conductive material of the short-circuiting section is provided as an outer conductor extending on the surface of the short-circuiting section electrically separated from the inner conductor.

11. The short-circuiting arrangement according to claim 9, wherein the inner conductor is provided in the interior of the short-circuiting section.

12. The short-circuiting arrangement according to claim 3, further comprising a resistor connected between the probing section and short-circuiting section of the short-circuiting wire in order to discharge the voltage below the discharge threshold.

13. The short-circuiting arrangement according to claim 2, further comprising a motor configured to move the short-circuiting wire along a group of capacitors, said motor being connected to the voltage evaluating unit for being controlled.

14. The short-circuiting arrangement according to claim 3, further comprising a motor configured to move the short-circuiting wire along a group of capacitors, said motor being connected to the voltage evaluating unit for being controlled.

15. A method for short-circuiting capacitors of a high voltage converter, said capacitors each having two connection terminals, the method comprising the steps of:
  moving a short-circuiting wire along while in sliding contact with the connection terminals of a capacitor of the converter, said short-circuiting wire comprising a short-circuiting section with electrically conductive material connected to a ground potential and a probing section comprising electrically conductive material;
  measuring the voltage across the capacitor as the probing section and short-circuiting section are connected to respective connection terminals of the capacitor;
  comparing the voltage with a discharge threshold; and
  enabling halting or movement of the short-circuiting wire based on the detected voltage.

16. The method according to claim 15, wherein the enabling of halting or movement of the short-circuiting wire based on the detected voltage comprises enabling a halting of the movement as long as the discharge threshold is exceeded and enabling a movement of the short-circuiting wire so that the short circuiting-section is connected to both terminals of the capacitor when the voltage is below the discharge threshold.

17. The method according to claim 16, further comprising the step of passively waiting until the capacitor voltage has fallen below the discharge threshold.

18. The method according to claim 16, further comprising discharging the capacitor using a resistor connected between the probing section and the short-circuiting section.

19. The method according to claim 18, further comprising short-circuiting the capacitor when the capacitor voltage is below the discharge threshold.

20. A method according to claim 15, wherein the capacitor is a capacitor in a converter cell, said cell further comprising a cell control unit with a power supply terminal through which a power supply wire providing a power supply voltage runs, the method further comprising moving the power supply wires along while in sliding contract with the power supply terminals of the cells in synchronism with the moving of the short-circuiting wire along the connection terminals of capacitors of these cells.

* * * * *